A. E. LYCAN.
SPOON.
APPLICATION FILED JUNE 3, 1915.

1,173,010. Patented Feb. 22, 1916.

WITNESSES
F. D. Sweet
Walton Harrison

INVENTOR
A. E. Lycan
BY Munn & Co
ATTORNEYS

THE COLUMBIA PLANOGRAPH CO., WASHINGTON, D. C.

UNITED STATES PATENT OFFICE.

ALBERT E. LYCAN, OF KOOSKIA, IDAHO.

SPOON.

1,173,010.  Specification of Letters Patent.  Patented Feb. 22, 1916.

Application filed June 3, 1915.  Serial No. 31,849.

*To all whom it may concern:*

Be it known that I, ALBERT E. LYCAN, a citizen of the United States, and a resident of Kooskia, in the county of Idaho and State of Idaho, have invented a new and Improved Spoon, of which the following is a full, clear, and exact description.

My invention relates to spoons and analogous articles, and more particularly to these devices when employed for table use.

I seek to provide the spoon or its equivalent with a handle having a special form for preventing the handle from easily slipping upon the edge of a pan or dish, and in doing this for preventing the handle from becoming submerged in the contents of the pan or dish.

More particularly stated, I seek to provide a spoon for table use having a handle so formed as to afford a good surface to be gripped by the fingers, this surface also having serrations or teeth for hooking upon the edge of a vessel with which the use of the spoon is associated.

Reference is made to the accompanying drawing forming part of this specification and in which like letters indicate like parts.

Figure 1:
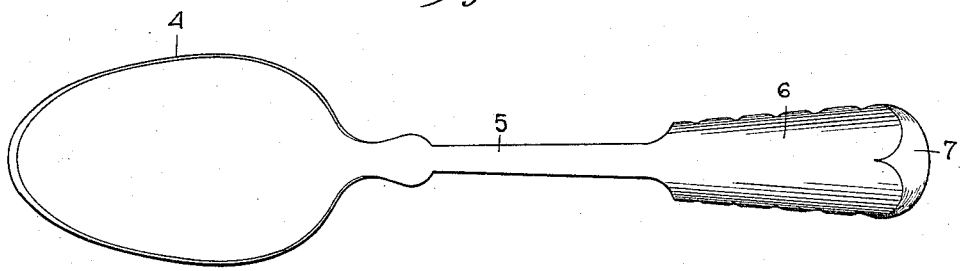
Figure 2:
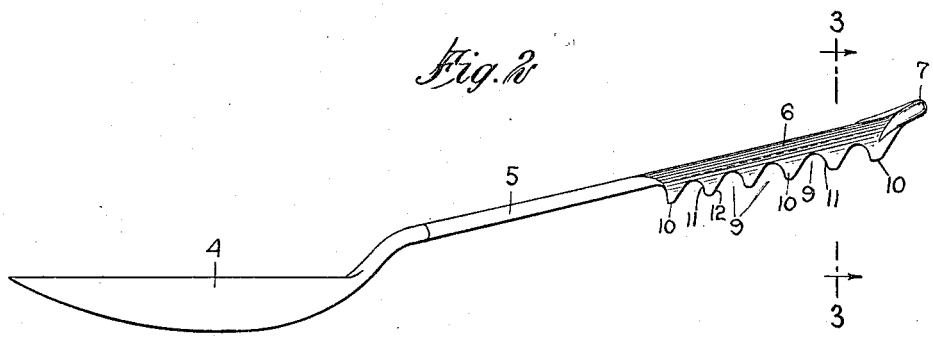
Figure 3:
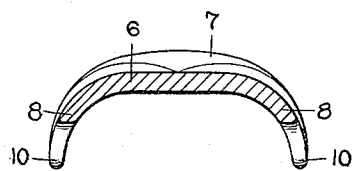

Figure 1 is a plan view of the spoon complete; Fig. 2 is a side elevation of the same; and Fig. 3 is a section on the line 3—3, Fig. 2, looking in the direction of the arrow.

The bowl of the spoon appears at 4, the stem at 5 and the handle at 6. The handle has in cross-section the general form indicated in Fig. 3, and is provided with a rounded end portion 7 serving as a tip. The handle is provided with curved edges 8, the latter being each provided with a number of serrations or teeth 10 separated by intervening spaces 9, thus constituting notches. These serrations or teeth 10 may be of any desired form, but are preferably made as indicated in Fig. 2. Thus each tooth is shortest on the side 11 which is nearest the bowl 4 and the rear or outer side 12 of each tooth is longer, so that the teeth are practically hook-shaped.

The operation of my device is as follows:

The operator grasps the handle of the spoon and otherwise manipulates the article in the usual manner. After using the spoon he can rest it with the bowl 4 inside of a vessel the handle 6 lodging upon the rim of the vessel in such a manner that two of the notches 10 hook slightly over said rim and thus prevent the spoon from sliding downwardly into the vessel, there being a number of notches 10, and these notches being disposed on opposite sides of the handle, as indicated in Fig. 3, and each notch serving the purpose of a hook, so that the handle may be disposed at a large number of different angles and yet secure an adequate grip upon the rim of the vessel; that is to say, the handle will hold relatively to the rim no matter whether the two notches which happen to engage the rim are mates or otherwise. The third notch on one side and the fourth notch on the other side may engage the rim of the vessel, or it may be that the latter is engaged by a pair of notches in exact registry with each other.

Having thus described my invention, I claim as new and desire to secure by Letters Patent:

1. As an article of manufacture, a spoon provided with a handle having its opposite side edges curved downward and each edge formed with a series of teeth adapted to engage the edge of the bowl or other receptacle and thus support the spoon at different heights in a bowl or other receptacle in which it may be used.

2. The improved article of manufacture consisting of a spoon provided with a handle having its side edges curved downward and each edge having a series of hook-shaped teeth that project toward the bowl of the spoon as and for the purpose specified.

In testimony whereof I have signed my name to this specification in the presence of two subscribing witnesses.

ALBERT E. LYCAN.

Witnesses:
J. H. RODGERS,
CHARLES M. BUTLER.

Copies of this patent may be obtained for five cents each, by addressing the "Commissioner of Patents, Washington, D. C."